United States Patent
Piorkowski et al.

(10) Patent No.: US 10,687,547 B2
(45) Date of Patent: Jun. 23, 2020

(54) COMPOSITIONS AND METHODS FOR INHIBITING PRECIPITATION OF DYES IN A BEVERAGE

(71) Applicant: Kraft Foods Group Brands LLC, Chicago, IL (US)

(72) Inventors: Daniel Piorkowski, Fairfield, CT (US); Thomas Plonski, White Plains, NY (US); Karl Ragnarsson, Chester, NY (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

(21) Appl. No.: 13/767,589

(22) Filed: Feb. 14, 2013

(65) Prior Publication Data

US 2013/0259986 A1    Oct. 3, 2013

Related U.S. Application Data

(60) Provisional application No. 61/599,307, filed on Feb. 15, 2012.

(51) Int. Cl.
| | | |
|---|---|---|
| A23L 2/58 | (2006.01) | |
| A23L 2/52 | (2006.01) | |
| A23L 2/44 | (2006.01) | |

(52) U.S. Cl.
CPC ............... A23L 2/58 (2013.01); A23L 2/44 (2013.01); A23L 2/52 (2013.01)

(58) Field of Classification Search
CPC .............. A23L 2/52; A23L 2/58; A23L 2/44
USPC ................................................. 426/250, 540
See application file for complete search history.

(56) References Cited

U.S. PATENT DOCUMENTS

| | | | |
|---|---|---|---|
| 4,497,835 A | | 2/1985 | Winston |
| 4,664,925 A | | 5/1987 | McShane |
| 5,336,510 A | * | 8/1994 | Chang ............... A23L 2/58 |
| | | | 426/262 |
| 5,780,086 A | | 7/1998 | Kirksey et al. |
| 7,205,018 B2 | | 4/2007 | Sherwood et al. |
| 7,794,770 B2 | | 9/2010 | Sherwood et al. |
| 7,799,363 B2 | | 9/2010 | Sherwood et al. |
| 7,842,326 B2 | | 11/2010 | Sherwood et al. |

(Continued)

FOREIGN PATENT DOCUMENTS

| | | |
|---|---|---|
| CN | 101616606 A | 12/2009 |
| EP | 1121868 A1 | 8/2001 |

(Continued)

OTHER PUBLICATIONS

Sari Lehto, et al. (2017) Comparison of food colour regulations in the EU and the US: a review of current provisions, Food Additives & Contaminants: Part A, 34:3, 335-355, DOI: 10.1080/19440049.2016.1274431 (Year: 2017), Table 4-pages (345-349).*

(Continued)

*Primary Examiner* — Subbalakshmi Prakash
(74) *Attorney, Agent, or Firm* — Fitch, Even, Tabin & Flannery LLP

(57) ABSTRACT

A beverage product containing a first azo-component and a second azo-component in a weight about 1:999 to about 999:1; an electrolyte; and a solvent, wherein the first azo-component and the second-component remain in solution for at least thirty days.

52 Claims, 2 Drawing Sheets

(56) References Cited

U.S. PATENT DOCUMENTS

| | | |
|---|---|---|
| 7,897,192 B2 | 3/2011 | Sherwood et al. |
| 7,906,160 B2 | 3/2011 | Sherwood et al. |
| 2003/0134007 A1 | 7/2003 | Donhowe |
| 2004/0091589 A1 | 5/2004 | Roy et al. |
| 2007/0014909 A1 | 1/2007 | Mai et al. |
| 2007/0014910 A1 | 1/2007 | Altemueller et al. |
| 2007/0172511 A1 | 7/2007 | Harrison et al. |
| 2007/0184177 A1 | 8/2007 | Harrison et al. |
| 2007/0298083 A1 | 12/2007 | Mehansho et al. |
| 2007/0298156 A1 | 12/2007 | Mehansho et al. |
| 2007/0299133 A1 | 12/2007 | Mehansho et al. |
| 2008/0175977 A1 | 7/2008 | Harrison et al. |
| 2009/0280147 A1 | 11/2009 | Alberius et al. |
| 2009/0298952 A1 | 12/2009 | Brimmer et al. |
| 2010/0028444 A1* | 2/2010 | Matuschek et al. .......... 424/489 |
| 2010/0034894 A1 | 2/2010 | Szymezak et al. |
| 2010/0047426 A1 | 2/2010 | Matuschek et al. |
| 2010/0285201 A1 | 11/2010 | Catabu et al. |
| 2011/0008508 A1 | 1/2011 | Catani et al. |

FOREIGN PATENT DOCUMENTS

| | | |
|---|---|---|
| EP | 2025364 | 2/2009 |
| GB | 1114540 | 5/1968 |
| JP | S50148562 A | 11/1975 |
| WO | 2009086045 | 7/2009 |
| WO | 2009086049 | 7/2009 |
| WO | 2010017433 | 2/2010 |
| WO | 2011103378 | 8/2011 |

OTHER PUBLICATIONS

Furia, Thomas E., CRC Handbook of Food Additives, 2nd Edition, vol. II; CRC Press, Inc.(1980), Boca Raton, Florida.

Fang Y et al. "Origin and Thermodynamic Properties of the Instability of Synthetic Azo Colorants in Gum Arabic Solutions" J Agric Food Chem 55:22 pp. 9274-9282 (2007).

International Patent Application No. PCT/US2013/026273 International Search Report dated Jul. 29, 2014 (7 pages).

International Patent Application No. PCT/US2013/026273 Written Opinion dated Jul. 29, 2014 (8 pages).

Australian Patent Application No. 2013221449 Patent Examination Report No. 1 dated Nov. 6, 2015 (3 pages).

Chinese Patent Application No. 201380012412.0 Notice on the First Office Action dated Sep. 15, 2015 (19 pages).

Chinese Patent Application No. 201380012412.0 Notice on the Second Office Action dated May 19, 2016 (22 pages).

Chinese Patent Application No. 201380012412.0 Notice on the Third Office Action dated Oct. 26, 2016.

Chinese Patent Application No. 201380012412.0 Decision of Rejection dated Jul. 7, 2017.

European Patent Application No. 13706878.9 Communication pursuant to Article 94(3) EPC dated Jan. 12, 2017 (6 pages).

European Patent Application No. 13706878.9 Communication pursuant to Article 94(3) EPC dated Jun. 16, 2017 (5 pages).

Japanese Patent Application No. 2014-557796 Office Action Summary dated Nov. 15, 2016 (5 pages).

Japanese Patent Application No. 2014-557796 Official Action dated Jul. 18, 2016 (3 pages).

Mexican Patent Application No. MX/a/2014/009734 First Office Action dated Jul. 9, 2017 (8 pages).

Russian Patent Application No. 2014135179 Office Action dated Aug. 28, 2014 (5 pages).

Yapeng Fang et al: "Origin and Thermodynamic Properties of the Instability of Synthetic Azo Colorants in Gum Arabic Solutions" Journal of Agricultural and Food Chemistry, vol. 55, No. 22, 2007, pp. 9274-9282.

Mexican Application No. MX/a/2014/009734 Office Action 2.
Mexican Application No. MX/a/2014/009734 Office Action 3.
EP18170038.36 Search Report dated May 22, 2018.

\* cited by examiner

COMPOSITIONS AND METHODS FOR INHIBITING PRECIPITATION OF DYES IN A BEVERAGE

CROSS-REFERENCE TO RELATED APPLICATIONS

This application claims priority benefit from U.S. Provisional Patent Application No. 61/599,307, filed on Feb. 15, 2012, which is incorporated by reference in its entirety.

BACKGROUND OF THE INVENTION

Beverage products, such as beverages or beverage concentrates, are often subject to detrimental ingredient interactions that form precipitation and other undesirable effects. Preventing such precipitation and other undesirable side effects may become an increased challenge in beverage products including electrolytes, which may include free ions that make the substance electrically conductive. In some cases, electrolytes may induce further reactions and/or precipitation. Additionally, exposing beverage products to low temperatures, such as during refrigeration, may reduce overall solubility and cause further instability of the beverage product.

The present invention generally relates to compositions and methods for a beverage product such as an electrolyte beverage, demonstrating resistance to precipitation of dyes over desired time and temperature conditions.

BRIEF SUMMARY OF THE INVENTION

According to some embodiments of the present invention, a beverage product includes a solution of: a first azo-component and a second azo-component; an electrolyte; and a solvent, wherein the first azo-dye and the second-azo remain in solution for at least seven days. In some embodiments, the weight ratio of the first azo-component to the second azo-component is about 1:999 to about 999:1; or about 1:99 to about 99:1.

In some embodiments, at least one of the first azo-component and the second azo-component is an azo-dye. In some embodiments, the solution includes a non azo-dye colorant. In some embodiments, the beverage composition contains no more than 0.12 wt % benzaldehyde.

In certain embodiments, the first azo-component and the second-azo component remain in solution for at least thirty days; the first azo-component and the second-azo component remain in solution for at least one year; and/or the first azo-component and the second azo-component remain in solution for at least seven days under refrigeration.

According to some embodiments of the present invention, a beverage product includes a first azo-component and a second azo-component; an electrolyte; and a solvent, wherein the first azo-component and the second-component remain in solution for a period of time longer than a period of time that the first azo-component would remain in a solution not containing the second azo-component.

According to some embodiments of the present invention, a beverage product includes a solution of: an azo-dye; a non azo-dye colorant; an electrolyte; and a solvent, wherein the azo-dye remains in solution for at least seven days. In some embodiments, the non azo-dye colorant may be an anthocyanin based natural color, betacarotene, caramel, carotenoids, turmeric, riboflavin, titanium dioxide, curcumin, cochineal, chlorophylls, annatto, paprika, lycopene, lutein, betanin, calcium carbonate, indigoid groupings, triphenylmethane, or xanthene. In some embodiments, the azo-dye remains in solution for at least one year; and/or the azo-dye remains in solution for at least seven days under refrigeration.

According to some embodiments of the present invention, a method of preventing precipitation of azo-dyes from a beverage product includes preparing a solution comprising: a first azo-component and a second azo-component, wherein the weight ratio of the first azo-component to the second azo-component is about 1:999 to about 999:1; an electrolyte; and a solvent, wherein the first azo-component and the second-azo component remain in solution for at least seven days.

BRIEF DESCRIPTION OF THE SEVERAL VIEWS OF THE DRAWINGS

The foregoing summary, as well as the following detailed description of certain embodiments of the food product will be better understood when read in conjunction with the following exemplary embodiments, the appended drawing and the appendices.

DETAILED DESCRIPTION OF THE INVENTION

Figure 1:
FIG. 1 shows a beverage product containing an azo-dye after one year of refrigeration.

Beverage products of the present invention, such as beverages or beverage concentrates, may be formulated to prevent detrimental ingredient interactions that form precipitation and other undesirable effects. Preventing such precipitation and other undesirable side effects may become an increased challenge in beverage products including electrolytes, such as sodium chloride. An electrolyte includes free ions that make the substance electrically conductive. In some cases, electrolytes in a beverage product may bind up free water, thereby increasing the ionic strength of a beverage product and inducing further reactions and/or precipitation. Azo-compounds, such as dyes, may be particularly susceptible to precipitation. Additionally, exposing beverage products to low temperatures, such as during refrigeration, may reduce overall solubility and cause further instability of the beverage product.

Methods and compositions of the present invention relate to beverage compositions including a solvent, one or more azo-compound, and one or more electrolyte. Azo-compounds are compounds bearing the functional group R—N=N—R', in which R and R' can be either aryl or alkyl. Azo-compounds may include azo-dyes. Azo-dyes include various red, brown, or yellow acidic or basic dyes derived from amino compounds, and food-grade azo-dyes are commonly used as colorants in food and beverage products. Examples of common azo-dyes used as food and beverage colorants include Red 40, Yellow 5, and Yellow 6.

Beverage products of the present invention may include ready to drink beverage and/or beverage concentrates. For example, a beverage product may be a concentrate that may be reconstituted in a range from about 1 part concentrate added to 5 parts water to about 1 part concentrate added to about 150 parts water; about 1 part concentrate added to 5 parts water to about 1 part concentrate added to about 149 parts water; about 1 part concentrate added to 10 parts water to about 1 part concentrate added to about 140 parts water; about 1 part concentrate added to 20 parts water to about 1 part concentrate added to about 130 parts water; about 1 part concentrate added to 30 parts water to about 1 part concentrate added to about 120 parts water; about 1 part concentrate added to 40 parts water to about 1 part concentrate added to about 110 parts water; about 1 part concentrate added to 50 parts water to about 1 part concentrate added to about 100 parts water; about 1 part concentrate added to 60 parts water to about 1 part concentrate added to about 90 parts water; about 1 part concentrate added to 70 parts water to about 1 part concentrate added to about 80 parts water; about 1 part concentrate added to 5 parts water; about 1 part concentrate added to about 10 parts water; about 1 part concentrate added to 20 parts water; about 1 part concentrate added to about 30 parts water; about 1 part concentrate added to 40 parts water; about 1 part concentrate added to about 50 parts water; about 1 part concentrate added to 60 parts water; about 1 part concentrate added to about 70 parts water; about 1 part concentrate added to 80 parts water; about 1 part concentrate added to about 90 parts water; about 1 part concentrate added to 100 parts water; about 1 part concentrate added to about 110 parts water; about 1 part concentrate added to 120 parts water; about 1 part concentrate added to about 130 parts water; about 1 part concentrate added to 140 parts water; about 1 part concentrate added to about 150 parts water; about 1 part concentrate added to 160 parts water; about 1 part concentrate added to about 170 parts water; about 1 part concentrate added to 180 parts water; about 1 part concentrate added to about 190 parts water; or about 1 part concentrate added to about 200 parts water. It is understood that in some embodiments, such reconstitution ranges are applicable to liquids other than water as well.

The reconstitution ratio of concentrates of some embodiments of the present invention may be determined based on the desired brix level and/or acid level of the end product. Reconstitution of concentrates of some embodiments of the present invention according to the reconstitution ratios disclosed herein may produce a brix level in the beverage of about 1 to about 25 brix or brix equivalency; about 1 to about 20 brix or brix equivalency; about 2 to about 15 brix or brix equivalency; about 7 to about 15 brix or brix equivalency; about 2 brix or brix equivalency; about 4 brix or brix equivalency; about 6 brix or brix equivalency; about 8 brix or brix equivalency; about 10 brix or brix equivalency; about 12 brix or brix equivalency; about 14 brix or brix equivalency; about 16 brix or brix equivalency; about 18 brix or brix equivalency; about 20 brix or brix equivalency; or about 25 brix or brix equivalency. Reconstitution of concentrates of some embodiments of the present invention according to the reconstitution ratios disclosed herein may produce an acid level in the beverage of about 0.01 wt % to about 2 wt % of the beverage; about 0.01 wt % to about 1 wt % of the beverage; about 0.02 wt % to about 0.8 wt % of the beverage; about 0.1 wt % to about 0.6 wt % of the beverage; about 0.01 wt % of the beverage; about 0.02 wt % of the beverage; about 0.05 wt % of the beverage; about 0.1 wt % of the beverage; about 0.5 wt % of the beverage; about 1 wt % of the beverage; about 1.5 wt % of the beverage; or about 2 wt % of the beverage.

Precipitation Resistant Formulations

It was observed that many solutions fail to keep a single azo-dye species stable in the presence of electrolyte ions. For example, the azo-dye (Yellow 5, Yellow 6, or Red 40) precipitated from solutions containing the following: (1) blends of two or more salts (including potassium chloride, tripotassium phosphate, sodium chloride, and magnesium chloride) with a single azo-dye; (2) sweetener (including sucrose, fructose, and raw honey) and a single azo-dye; and (3) fiber (such as inulin) with sodium chloride and a single azo-dye.

However, in some embodiments of the present invention, beverage products are formulated to inhibit precipitation of dyes from the composition. It has been found that beverage products formulated to include particular combinations of azo-compounds, to include a non-azo dye colorant, and/or to limit the level of benzaldehyde may inhibit precipitation of dyes from the compositions. These components may be combined in the selections and amounts described in any of the sections below.

While wishing to not be bound by theory, in some embodiments, it was observed that a solution of salt (sodium chloride) and water is free of precipitate, and a solution of an azo-dye (Yellow 5, Yellow 6, or Red 40) and water is free of precipitate. However, a solution of a salt, a single azo-dye species, and water is not stable and produces precipitate. Such precipitate is believed to be crystals of the azo-dye or possibly even co-crystals of the azo-dye with sodium chloride, sodium ions, chloride ions, or sodium and chloride ions. It is believed that the presence of an ion (not limited to sodium and/or chloride) creates an unfavorable environment for the azo-dye to exist in and causes the azo-dye to precipitate or crystallize. However, this crystallization or precipitation is not observed when levels of salt or azo-dye are below the threshold for the reaction to occur.

While wishing to not be bound by theory, a solution of benzaldehyde, salt, Red 40, and water causes precipitation through a different mechanism when compared to precipitate found from solutions of salt, an azo-dye, and water. In some embodiments, it was observed that solutions of (1) salt (sodium chloride) and water; (2) Red 40 and water; and (3) benzaldehyde and water are each free of precipitate. However, a solution of a salt, Red 40, benzaldehyde, and water is not stable and produces precipitate. Such precipitate is believed to be due the complexation of salt, Red 40, and benzaldehyde. This complexation may occur due to the thermodynamic unfavorability of all three components to exist in solution with one another. The precipitation found in this system appears to be more sediment-like rather than crystal-like precipitate found in a solution of Red 40, salt, and water. However, crystals or co-crystals may exist within the salt, Red 40, and benzaldehyde complexation and this complexation is not observed when levels of salt, azo-dye, or benzaldehyde are below the threshold for the reaction to occur. This phenomenon is unique to Red 40 and no complexations were observed in solutions of salt, Yellow 5, benzaldehyde, and water or salt, Yellow 6, benzaldehyde, and water.

Azo-Compound Combination

Beverage products of some embodiments of the present invention include a combination of two or more azo-compounds. In some embodiments, one or more of the azo-compounds may be azo-dyes. In some embodiments, beverage product formulations including two or more azo-compounds demonstrate inhibited precipitation of the azo-compounds from the beverage product. While not wishing to be bound by theory, inclusion of two or more types of azo-compounds in a beverage product formulation may inhibit precipitation of azo-dye from the beverage product due to the similar structures of the azo-compounds impeding or preventing the crystallization of each other, resulting in a clear, unprecipitated solution at refrigerated and/or ambient temperatures.

In some embodiments, inhibition of azo-dye precipitation depends on the ratio of the amount of the two or more types of azo-compounds included in the beverage product formulation. In some embodiments, a beverage product including two or more azo-compounds at a ratio between 1:3 and 3:1 demonstrates inhibited azo-dye precipitation at refrigerated and/or ambient temperatures. Beverage products of the some embodiments of the present invention include two or more azo-compounds in a ratio of about 1:999 to about 999:1; about 1:499 to about 499:1; about 1:99 to about 99:1; about 1:49 to about 49:1; about 1:24 to about 24:1; about 1:14 to about 14:1; about 1:9 to about 9:1; about 1:8 to about 8:1; about 1:7 to about 7:1; about 1:6 to about 6:1; about 1:5 to about 5:1; about 1:4 to about 4:1; about 1:3 to about 3:1; about 1:2 to about 2:1; about 1:999; about 1:499; about 1:99; about 1:49; about 1:24; about 1:14; about 1:9; about 1:8; about 1:7; about 1:6; about 1:5; about 1:4; about 1:3; about 1:2; or about 1:1.

In some embodiments, inhibition of azo-dye precipitation depends on the total weight percent of azo-compounds included in the beverage product. For example, in some cases, a reduced amount of azo-compounds in a beverage product corresponds to a lower ratio of azo-dyes to each other necessary to inhibit precipitation of the azo-dye from the beverage product. In one embodiment, a beverage product formulation containing 0.6 wt % azo-dye requires a 3:1 mixture of Red 40:Yellow 5 to keep the azo-dye in solution over time, whereas a beverage product formulation containing 0.3 wt % or 0.1 wt % azo-dye requires only a 99:1 ratio or less of Red 40:Yellow 5 to keep the azo-dye in solution over time.

Beverage products of some embodiments of the present invention include azo-compounds in an amount of about 0.001 wt % to about 6 wt % of the beverage product; about 0.005 wt % to about 6 wt % of the beverage product; about 0.01 wt % to about 6 wt % of the beverage product; about 0.05 wt % to about 6 wt % of the beverage product; about 0.05 wt % to about 5 wt % of the beverage product; about 0.05 wt % to about 4 wt % of the beverage product; about 0.05 wt % to about 3 wt % of the beverage product; about 0.05 wt % to about 2 wt % of the beverage product; about 0.05 wt % to about 1 wt % of the beverage product; about 0.1 wt % to about 0.9 wt % of the beverage product; about 0.1 wt % to about 0.8 wt % of the beverage product; about 0.1 wt % to about 0.7 wt % of the beverage product; about 0.1 wt % to about 0.6 wt % of the beverage product; about 0.2 wt % to about 0.5 wt % of the beverage product; about 0.3 wt % to about 0.4 wt % of the beverage product; about 0.001 of the beverage product; about 0.005 wt % of the beverage product; about 0.01 wt % of the beverage product; about 0.05 wt % of the beverage product; about 0.1 wt % of the beverage product; about 0.2 wt % of the beverage product; about 0.3 wt % of the beverage product; about 0.4 wt % of the beverage product; about 0.5 wt % of the beverage product; about 0.6 wt % of the beverage product; about 0.7 wt % of the beverage product; about 0.8 wt % of the beverage product; about 0.9 wt % of the beverage product; about 1 wt % of the beverage product; about 2 wt % of the beverage product; about 3 wt % of the beverage product; about 4 wt % of the beverage product; about 5 wt % of the beverage product; or about 6 wt % of the beverage product.

Azo-Dye with Non Azo-Dye Colorant

Beverage products of some embodiments of the present invention include one or more azo-dyes in combination with a non-azo-dye colorant. In some embodiments, beverage products containing one or more azo-dyes in combination with a non-azo-dye colorant demonstrate delayed the onset of crystallization/precipitation or eliminated crystallization/precipitation of the azo-dyes from the beverage product. Examples of suitable non azo-dye colorants include but are not limited to anthocyanin based natural colors, such as an anthocyanin-based natural red color like Black Carrot Anthocyanin; Blue 1; caramel; carotenoids; turmeric; riboflavin; titanium dioxide; curcumin; cochineal; chlorophylls; annatto; paprika; lycopene; lutein; betanin; calcium carbonate; indigoid groupings (FD&C Blue #2); triphenylmethane (FD&C Green #3 & FD&C Blue #1); xanthene (FD&C Red #3); and betacarotene.

In some embodiments, inclusion of a suitable amount of a non-azo-dye colorant in a beverage product can inhibit precipitation of azo-dye from the beverage product. Beverage products of some embodiments of the present invention may include a non-azo-dye such as an anthocyanin based natural color or Blue 1 in an amount of about 1 wt % to about 15 wt % of the beverage product; about 1 wt % to about 10 wt % of the beverage product; about 1 wt % to about 9 wt % of the beverage product; about 2 wt % to about 8 wt % of the beverage product; about 3 wt % to about 7 wt % of the beverage product; about 4 wt % to about 6 wt % of the beverage product; about 1 wt % of the beverage product; about 2 wt % of the beverage product; about 3 wt % of the beverage product; about 4 wt % of the beverage product; about 5 wt % of the beverage product; about 6 wt % of the beverage product; about 7 wt % of the beverage product; about 8 wt % of the beverage product; about 9 wt % of the beverage product; about 10 wt % of the beverage product; or about 15 wt % of the beverage product.

Non-Soluble Substances

Further, it has been found that the addition of non-soluble substances into the solution may delay the onset of crystallization. Such substances include but are not limited to clouding agents such as titanium dioxide; viscosity potentiators such as guar gum, xanthan gum, acacia gum, and modified-food starch; and flavor and cloud micro, nano, and conventional oil-in-water, fat-in-water, water-in-water, water-in-oil-in-water, and water-in-fat-in-water emulsions.

Beverage products of some embodiments of the present invention include non-soluble substances in an amount of about 0.001 wt % to about 20 wt % of the beverage product; about 0.005 wt % to about 20 wt % of the beverage product; about 0.01 wt % to about 15 wt % of the beverage product; about 0.05 wt % to about 10 wt % of the beverage product; about 0.05 wt % to about 8 wt % of the beverage product; about 0.05 wt % to about 6 wt % of the beverage product; about 0.05 wt % to about 4 wt % of the beverage product; about 0.05 wt % to about 2 wt % of the beverage product; about 0.05 wt % to about 1 wt % of the beverage product; about 0.1 wt % to about 0.9 wt % of the beverage product; about 0.1 wt % to about 0.8 wt % of the beverage product; about 0.1 wt % to about 0.7 wt % of the beverage product; about 0.1 wt % to about 0.6 wt % of the beverage product; about 0.2 wt % to about 0.5 wt % of the beverage product; about 0.3 wt % to about 0.4 wt % of the beverage product; about 0.001 of the beverage product; about 0.005 wt % of the beverage product; about 0.01 wt % of the beverage product; about 0.05 wt % of the beverage product; about 0.1 wt % of the beverage product; about 0.2 wt % of the beverage product; about 0.3 wt % of the beverage product; about 0.4 wt % of the beverage product; about 0.5 wt % of the beverage product; about 0.6 wt % of the beverage product; about 0.7 wt % of the beverage product; about 0.8 wt % of the beverage product; about 0.9 wt % of the beverage product; about 1 wt % of the beverage product; about 2 wt % of the beverage product; about 3 wt % of the beverage product; about 4 wt % of the beverage product;

about 5 wt % of the beverage product; about 6 wt % of the beverage product; about 7 wt % of the beverage product; about 8 wt % of the beverage product; or about 9 wt % of the beverage product.

Limited Benzaldehyde

Beverage products of some embodiments of the present invention include limited amounts of benzaldehyde. Benzaldehyde is a component of many flavors, but it has been found that by limiting the level of benzaldehyde in beverage products of the present invention, precipitation of azo-dyes is inhibited. In some embodiments, beverage products include benzaldehyde in an amount of no more than 5 wt % of the beverage product; no more than 4 wt % of the beverage product; no more than 3 wt % of the beverage product; no more than 2 wt % of the beverage product; no more than 1 wt % of the beverage product; no more than 0.8 wt % of the beverage product; no more than 0.6 wt % of the beverage product; no more than 0.4 wt % of the beverage product; no more than 0.2 wt % of the beverage product; no more than 0.1 wt % of the beverage product; no more than 0.08 wt % of the beverage product; no more than 0.06 wt % of the beverage product; no more than 0.04 wt % of the beverage product; no more than 0.02 wt % of the beverage product; no more than 0.01 wt %; no more than 0.001 wt %; or no more than 0.0001 wt % of the beverage product.

Solvents

Beverage products of some embodiments of the invention include one or more solvent. Any suitable solvent may be used, such as but not limited to water, ethanol, propylene glycol, 1,3 propane diol, triacetin, ethyl acetate, benzyl alcohol, and combinations thereof.

Electrolytes

Beverage products of the present invention may include electrolytes, such as those included in sports drinks. Any suitable type or amount of electrolytes may be included. Suitable electrolytes may include but are not limited to sodium such as sodium chloride, potassium, chloride, calcium, magnesium, bicarbonate, phosphate, sulfate, manganese, copper, zinc, and salts thereof.

A beverage product of some embodiments of the present invention may include electrolytes in an amount of about 0.03 wt % to about 20 wt % of the beverage product; about 0.03 wt % to about 15 wt % of the beverage product; about 0.03 wt % to about 10 wt % of the beverage product; about 2 wt % to about 9 wt % of the beverage product; about 3 wt % to about 8 wt % of the beverage product; about 4 wt % to about 7 wt % of the beverage product; about 0.03 wt % of the beverage product; about 0.05 wt % of the beverage product; about 0.1 wt % of the beverage product; about 0.5 wt % of the beverage product; about 1 wt % of the beverage product; about 2 wt % of the beverage product; about 3 wt % of the beverage product; about 4 wt % of the beverage product; about 5 wt % of the beverage product; about 6 wt % of the beverage product; about 7 wt % of the beverage product; about 8 wt % of the beverage product; about 9 wt % of the beverage product; about 10 wt % of the beverage product; about 15 wt % of the beverage product; or about 20 wt % of the beverage product. In some embodiments, when a beverage concentrate of the present invention is diluted to ready-to-drink strength, each serving (8 oz.) should provide about 10 mg to about 500 mg of electrolytes; most preferably about 30 mg to about 150 mg.

Acids

In some embodiments, beverage products of the present invention include an acid. In some embodiments, beverage products containing acid inhibit azo-component precipitation when compared to the same beverage product with no acid. In some embodiments, beverage products containing acid delay azo-component precipitation longer when compared to the same beverage product with no acid.

Beverage products may include any suitable acid, including organic and/or inorganic acids. In some embodiments, suitable acids include but are not limited to citric acid, malic acid, tartaric acid and/or phosphoric acid. Suitable organic acid additive salts include, but are not limited to, sodium, calcium, potassium, and magnesium salts of all organic acids, such as salts of citric acid, malic acid, tartaric acid, itaconic acid, fruitaric acid, malonic acid, succinic acid, acetic acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), and adipic acid. In some embodiments, the above-referenced organic acids optionally may be substituted with one or more moieties such as hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phospho, phosphonato, or any other viable functional group provided the substituted organic acid additives function to acidify the beverage.

Suitable inorganic acid additives for use in embodiments of this invention may include, but are not limited to, phosphoric acid, phosphorous acid, polyphosphoric acid, hydrochloric acid, sulfuric acid, carbonic acid, sodium dihydrogen phosphate, and their corresponding alkali or alkaline earth metal salts thereof (e.g., inositol hexaphosphate Mg/Ca).

In some embodiments, a beverage product includes an amount of acid which will provide a desired pH. In some embodiments, a beverage product has a desired pH of about 0.5 to about 13; about 1.2 to about 4.2; about 0.5; about 1; about 1.5; about 2; about 2.5; about 3; about 3.5; about 4; about 4.5; about 5; about 5.5; about 6; about 6.5; about 7; about 7.5; about 8; about 8.5; about 9; about 9.5; about 10; about 10.5; about 11; about 11.5; about 12; about 12.5; or about 13.

Beverage products of some embodiments of the present invention may include acid in an amount of about 0.1 wt % to about 50 wt % of the beverage product; about 0.5 wt % to about 50 wt % of the beverage product; about 1 wt % to about 50 wt % of the beverage product; about 5 wt % to about 45 wt % of the beverage product; about 10 wt % to about 40 wt % of the beverage product; about 15 wt % to about 35 wt % of the beverage product; about 20 wt % to about 30 wt % of the beverage product; about 0.1 wt % of the beverage product; about 0.5 wt % of the beverage product; about 1 wt % of the beverage product; about 5 wt % of the beverage product; about 10 wt % of the beverage product; about 15 wt % of the beverage product; about 20 wt % of the beverage product; about 25 wt % of the beverage product; about 30 wt % of the beverage product; about 35 wt % of the beverage product; about 40 wt % of the beverage product; about 45 wt % of the beverage product; or about 50 wt % of the beverage product. In some embodiments, a beverage concentrated includes an amount of acid to achieve an acid level in the ready-to-drink beverage of about 0.02 wt % to about 0.8 wt % of the beverage.

Sweeteners

Beverage products of some embodiments of the present invention include one or more sweeteners. In some embodiments, a sweetener may reduce the water activity of the solution, thereby causing solubility points of azo-components to decrease by percent volume. Suitable sweeteners may include natural sweeteners, artificial sweeteners, nutritive sweeteners and/or non-nutritive sweeteners. In some embodiments, a suitable sweetener may include a natural high-potency sweetener. As used herein, the phrase "natural high-potency sweetener" or "NHPS" means any sweetener found in nature which may be in raw, extracted, purified, or any other suitable form, singularly or in combination thereof. An NHPS may characteristically have a sweetness potency greater than sucrose, fructose, or glucose, yet may have less calories. Non-limiting examples of NHPSs which may be suitable for embodiments of this invention includes natural high-potency sweeteners, such as rebaudioside A, rebaudioside B, rebaudioside C, rebaudioside D, rebaudioside E, rebaudioside F, dulcoside A, dulcoside H, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, and cyclocarioside I.

Suitable artificial sweeteners may include but are not limited to sucralose, acesulfame potassium or other salts, aspartame, alitame, saccharin, neohesperidin dihydrochalcone, cyclamate, neotame, N—[N-[3-(3-hydroxy-4-methoxyphenyl)propyl]-L-a-aspartyl]-L-10 phenylalanine 1-methyl ester, N—[N-[3-(3-hydroxy-4-methoxyphenyl)-3-methylbutyl]-L-aaspartyl]-L-phenylalanine 1-methyl ester, N—[N-[3-(3-methoxy-4-hydroxyphenyl)propyl]L-a-aspartyl]-L-phenylalanine 1-methyl ester, salts thereof, and the like.

Beverage products of the present invention may include carbohydrate sweeteners e.g. wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, palatinose oligosaccharides, fucose, fractooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup; wherein the at least one polyol additive is chosen from erythritol, maltitol, mannitol, sorbitol, lactitol, xylitol, inositol, isomalt, propylene glycol, glycerol (glycerine), threitol, galactitol, palatinose, reduced isomalto-oligosaccharides, reduced xylo-oligosaccharides, reduced gentio-oligosaccharides, reduced maltose syrup, or reduced glucose syrup; and wherein the at least one amino acid additive is chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In some embodiments, a sweetener may be present in a beverage product in an amount of about 5 ppm to about 700,000 ppm; about 5 ppm to about 600,000 ppm; about 5 ppm to about 500 ppm; about 5 ppm to about 400,000 ppm; about 5 ppm to about 300,000 ppm; about 100 ppm to about 275,000 ppm; about 200 ppm to about 250,000 ppm; about 500 ppm to about 225,000 ppm; about 750 ppm to about 200,000 ppm; about 1,000 ppm to about 175,000 ppm; about 1,500 ppm to about 150,000 ppm; about 2,000 ppm to about 150,000 ppm; about 3,000 ppm to about 150,000 ppm; about 4,000 ppm to about 150,000 ppm; about 5,000 ppm to about 150,000 ppm; about 7,500 ppm to about 125,000 ppm; about 10,000 ppm to about 100,000 ppm; about 12,500 ppm to about 75,000 ppm; about 15,000 ppm to about 50,000 ppm; 17,500 ppm to about 25,000 ppm; about 5 ppm; about 100 ppm; about 200 ppm; about 500 ppm; about 750 ppm; about 1,000 ppm; about 1,500 ppm; about 2,000 ppm; about 3,000 ppm; about 4,000 ppm; about 5,000 ppm; about 7,500 ppm; about 10,000 ppm; about 12,500 ppm; about 15,000 ppm; about 17,500 ppm; about 20,000 ppm; about 50,000 ppm; about 75,000 ppm; about 100,000 ppm; about 125,000 ppm; about 150,000 ppm; about 175,000 ppm; about 200,000 ppm; about 225,000 ppm; about 250,000 ppm; about 275,000 ppm; about 300,000 ppm; about 400,000 ppm; about 500,000 ppm; about 600,000 ppm; or about 700,000 ppm. In some embodiments, a beverage concentrate includes sweetener in an amount sufficient to achieve a brix or brix equivalence in the ready-to-drink beverage of about 1 to about 25.

Additional Ingredients

Beverage products of the present invention may include any additional components to achieve the desired final product. For example, beverage products may include flavorings, preservatives, coloring, vitamins, electrolytes, fortification, buffers, gums, clouding agents, herbs and other functional ingredients, and tea solids.

Beverage products may include any suitable flavoring, including but not limited to acerola, apple, berries, caja, cashew, grape, grapefruit, graviola, guava, hibiscus, horchata, lemon, lemonade, lime, mandarin, mango, melon, orange, orange-banana, orange-banana-strawberry, orange-grapefruit-lime, orange-mango, orange-*papaya*, orange-strawberry-kiwi, passion fruit, peach, pear, pear-banana, pineapple, pineapple-coconut, seriguela, strawberry, sweet orange, tamarind, tangerine, tuna (cactus fig) and watermelon.

Beverage products may include any suitable coloring in addition to those discussed herein, including FDA certified coloring as well as colorings exempt from certification.

Beverage products may include any suitable preservative, including but not limited to potassium sorbate, potassium benzoate, sodium benzoate, sodium hexa-meta-phosphate, EDTA, nisin, natamycin, polylysine, dimethyl carbonate or any other natural or artificial preservative.

Solution

Beverage products of some embodiments of the present invention may be in the form of a solution. Desired ingredients of the beverage product may be added to the solvent under agitation. In some embodiments, desired ingredients may be combined at ambient temperature; at a temperature of about 33° F. to about 75° F.; about 33° F. to about 300° F.; about 68° F. to about 75° F.; greater than about 75° F.;

about 130° F. to about 300° F.; or about 150° F. to about 180° F. Ambient temperature is understood to mean a temperature of about 68° F. to about 77° F.

In some embodiments, the food composition may be formulated as described above to sustain solubility of azo-dyes in the solvent for at least 1 month; at least 2 months; at least 3 months; at least 4 months; at least 5 months; at least 6 months; at least 7 months; at least 8 months; at least 9 months; at least 10 months; at least 11 months; at least 12 months; at least 13 months; at least 14 months; at least 15 months; at least 16 months; at least 17 months; at least 18 months; at least 2 years; at least 2.5 years, or at least 3 years. In some embodiments, beverage products allow for the one or more azo-dye to be kept in solution under ambient and/or refrigerated conditions. Refrigerated conditions are understood to mean temperatures of about 33° F. to about 50° F.; about 33° F. to about 45° F.; or about 36° F. to about 42° F.

EXAMPLES

Example 1

Beverage products were prepared according to the following formulations:

| Formulation | Component, wt % | | | | | |
|---|---|---|---|---|---|---|
| | Red 40 | Yellow 5 | NaCl | Water | Citric Acid | Potassium Citrate |
| C1 | 0.6 | 0 | 6 | 61.92 | 0 | 0 |
| C2 | 0.6 | 0 | 6 | 61.92 | 19 | 0 |
| C3 | 0.6 | 0 | 6 | 61.92 | 19 | 1.5 |
| 1A | 0.51 | 0.09 | 6 | 61.92 | 0 | 0 |
| 2A | 0.51 | 0.09 | 6 | 61.92 | 19 | 0 |
| 3A | 0.51 | 0.09 | 6 | 61.92 | 19 | 1.5 |
| 1B | 0.45 | 0.15 | 6 | 61.92 | 0 | 0 |
| 2B | 0.45 | 0.15 | 6 | 61.92 | 19 | 0 |
| 3B | 0.45 | 0.15 | 6 | 61.92 | 19 | 1.5 |

The additional components, including flavors or other components, comprise the remaining weight percent of the formulations in the chart. The beverage products were prepared and stored at ambient and refrigerated conditions. Samples C1, C2, C3, 1A, 2A, and 3A precipitated within thirty days under refrigerated conditions, but remained soluble under ambient conditions for more than thirty days.

Samples 1B, 2B, and 3B remained soluble under ambient and refrigerated conditions for more than thirty days.

The samples demonstrate the effect of the ratio of azo-dyes to each other in inhibiting precipitation. Samples 1A, 2A, and 3A formed precipitate because the ratio of one azo-dye to another (15:85) was not sufficient to prevent precipitation under refrigerated conditions. However, samples 1B, 2B, and 3B had a sufficient ratio (25:75) to prevent precipitation over the course of more than thirty days.

Example 2

Beverage products were prepared according to the following percent-weight formulations:

| | | Set 1: 0.6 wt % azo-dye | | | | | |
|---|---|---|---|---|---|---|---|
| | | Red 40 | Yellow 5 | Citric Acid | Potassium Citrate | Salt | Water |
| Sample 1 | Base | 0.6 | 0 | 0 | 0 | 6 | 61.92 |
| | Acid | 0.6 | 0 | 19 | 0 | 6 | 61.92 |
| | Base + Acid | 0.6 | 0 | 19 | 1.5 | 6 | 61.92 |
| Sample 2 | Base | 0.594 | 0.006 | 0 | 0 | 6 | 61.92 |
| | Acid | 0.594 | 0.006 | 19 | 0 | 6 | 61.92 |
| | Base + Acid | 0.594 | 0.006 | 19 | 1.5 | 6 | 61.92 |
| Sample 3 | Base | 0.57 | 0.03 | 0 | 0 | 6 | 61.92 |
| | Acid | 0.57 | 0.03 | 19 | 0 | 6 | 61.92 |
| | Base + Acid | 0.57 | 0.03 | 19 | 1.5 | 6 | 61.92 |
| Sample 4 | Base | 0.54 | 0.06 | 0 | 0 | 6 | 61.92 |
| | Acid | 0.54 | 0.06 | 19 | 0 | 6 | 61.92 |
| | Base + Acid | 0.54 | 0.06 | 19 | 1.5 | 6 | 61.92 |
| Sample 5 | Base | 0.51 | 0.09 | 0 | 0 | 6 | 61.92 |
| | Acid | 0.51 | 0.09 | 19 | 0 | 6 | 61.92 |
| | Base + Acid | 0.51 | 0.09 | 19 | 1.5 | 6 | 61.92 |
| Sample 6 | Base | 0.48 | 0.12 | 0 | 0 | 6 | 61.92 |
| | Acid | 0.48 | 0.12 | 19 | 0 | 6 | 61.92 |
| | Base + Acid | 0.48 | 0.12 | 19 | 1.5 | 6 | 61.92 |
| Sample 7 | Base | 0.45 | 0.15 | 0 | 0 | 6 | 61.92 |
| | Acid | 0.45 | 0.15 | 19 | 0 | 6 | 61.92 |
| | Base + Acid | 0.45 | 0.15 | 19 | 1.5 | 6 | 61.92 |
| Sample 8 | Base | 0.42 | 0.18 | 0 | 0 | 6 | 61.92 |
| | Acid | 0.42 | 0.18 | 19 | 0 | 6 | 61.92 |
| | Base + Acid | 0.42 | 0.18 | 19 | 1.5 | 6 | 61.92 |
| Sample 9 | Base | 0.39 | 0.21 | 0 | 0 | 6 | 61.92 |
| | Acid | 0.39 | 0.21 | 19 | 0 | 6 | 61.92 |
| | Base + Acid | 0.39 | 0.21 | 19 | 1.5 | 6 | 61.92 |
| Sample 10 | Base | 0.36 | 0.24 | 0 | 0 | 6 | 61.92 |
| | Acid | 0.36 | 0.24 | 19 | 0 | 6 | 61.92 |
| | Base + Acid | 0.36 | 0.24 | 19 | 1.5 | 6 | 61.92 |
| Sample 11 | Base | 0.33 | 0.27 | 0 | 0 | 6 | 61.92 |
| | Acid | 0.33 | 0.27 | 19 | 0 | 6 | 61.92 |
| | Base + Acid | 0.33 | 0.27 | 19 | 1.5 | 6 | 61.92 |
| Sample 12 | Base | 0.3 | 0.3 | 0 | 0 | 6 | 61.92 |
| | Acid | 0.3 | 0.3 | 19 | 0 | 6 | 61.92 |
| | Base + Acid | 0.3 | 0.3 | 19 | 1.5 | 6 | 61.92 |
| Sample 13 | Base | 0.27 | 0.33 | 0 | 0 | 6 | 61.92 |
| | Acid | 0.27 | 0.33 | 19 | 0 | 6 | 61.92 |
| | Base + Acid | 0.27 | 0.33 | 19 | 1.5 | 6 | 61.92 |
| Sample 14 | Base | 0.24 | 0.36 | 0 | 0 | 6 | 61.92 |
| | Acid | 0.24 | 0.36 | 19 | 0 | 6 | 61.92 |
| | Base + Acid | 0.24 | 0.36 | 19 | 1.5 | 6 | 61.92 |
| Sample 15 | Base | 0.21 | 0.39 | 0 | 0 | 6 | 61.92 |
| | Acid | 0.21 | 0.39 | 19 | 0 | 6 | 61.92 |
| | Base + Acid | 0.21 | 0.39 | 19 | 1.5 | 6 | 61.92 |
| Sample 16 | Base | 0.18 | 0.42 | 0 | 0 | 6 | 61.92 |
| | Acid | 0.18 | 0.42 | 19 | 0 | 6 | 61.92 |
| | Base + Acid | 0.18 | 0.42 | 19 | 1.5 | 6 | 61.92 |
| Sample 17 | Base | 0.15 | 0.45 | 0 | 0 | 6 | 61.92 |
| | Acid | 0.15 | 0.45 | 19 | 0 | 6 | 61.92 |
| | Base + Acid | 0.15 | 0.45 | 19 | 1.5 | 6 | 61.92 |
| Sample 18 | Base | 0.12 | 0.48 | 0 | 0 | 6 | 61.92 |
| | Acid | 0.12 | 0.48 | 19 | 0 | 6 | 61.92 |
| | Base + Acid | 0.12 | 0.48 | 19 | 1.5 | 6 | 61.92 |
| Sample 19 | Base | 0.09 | 0.51 | 0 | 0 | 6 | 61.92 |
| | Acid | 0.09 | 0.51 | 19 | 0 | 6 | 61.92 |
| | Base + Acid | 0.09 | 0.51 | 19 | 1.5 | 6 | 61.92 |

Set 1: 0.6 wt % azo-dye

|  |  | Red 40 | Yellow 5 | Citric Acid | Potassium Citrate | Salt | Water |
|---|---|---|---|---|---|---|---|
| Sample 20 | Base | 0.06 | 0.54 | 0 | 0 | 6 | 61.92 |
|  | Acid | 0.06 | 0.54 | 19 | 0 | 6 | 61.92 |
|  | Base + Acid | 0.06 | 0.54 | 19 | 1.5 | 6 | 61.92 |
| Sample 21 | Base | 0.03 | 0.57 | 0 | 0 | 6 | 61.92 |
|  | Acid | 0.03 | 0.57 | 19 | 0 | 6 | 61.92 |
|  | Base + Acid | 0.03 | 0.57 | 19 | 1.5 | 6 | 61.92 |
| Sample 22 | Base | 0.006 | 0.594 | 0 | 0 | 6 | 61.92 |
|  | Acid | 0.006 | 0.594 | 19 | 0 | 6 | 61.92 |
|  | Base + Acid | 0.006 | 0.594 | 19 | 1.5 | 6 | 61.92 |
| Sample 23 | Base | 0 | 0.6 | 0 | 0 | 6 | 61.92 |
|  | Acid | 0 | 0.6 | 19 | 0 | 6 | 61.92 |
|  | Base + Acid | 0 | 0.6 | 19 | 1.5 | 6 | 61.92 |

Set 2: 0.3 wt % azo-dye

|  |  | Red 40 | Yellow 5 | Citric Acid | Potassium Citrate | Salt | Water |
|---|---|---|---|---|---|---|---|
| Sample 1 | Base | 0.3 | 0 | 0 | 0 | 6 | 61.92 |
|  | Acid | 0.3 | 0 | 8.5 | 0 | 6 | 61.92 |
|  | Base + Acid | 0.3 | 0 | 8.5 | 1.5 | 6 | 61.92 |
| Sample 2 | Base | 0.27 | 0.03 | 0 | 0 | 6 | 61.92 |
|  | Acid | 0.27 | 0.03 | 8.5 | 0 | 6 | 61.92 |
|  | Base + Acid | 0.27 | 0.03 | 8.5 | 1.5 | 6 | 61.92 |
| Sample 3 | Base | 0.24 | 0.06 | 0 | 0 | 6 | 61.92 |
|  | Acid | 0.24 | 0.06 | 8.5 | 0 | 6 | 61.92 |
|  | Base + Acid | 0.24 | 0.06 | 8.5 | 1.5 | 6 | 61.92 |
| Sample 4 | Base | 0.21 | 0.09 | 0 | 0 | 6 | 61.92 |
|  | Acid | 0.21 | 0.09 | 8.5 | 0 | 6 | 61.92 |
|  | Base + Acid | 0.21 | 0.09 | 8.5 | 1.5 | 6 | 61.92 |
| Sample 5 | Base | 0.18 | 0.12 | 0 | 0 | 6 | 61.92 |
|  | Acid | 0.18 | 0.12 | 8.5 | 0 | 6 | 61.92 |
|  | Base + Acid | 0.18 | 0.12 | 8.5 | 1.5 | 6 | 61.92 |
| Sample 6 | Base | 0.15 | 0.15 | 0 | 0 | 6 | 61.92 |
|  | Acid | 0.15 | 0.15 | 8.5 | 0 | 6 | 61.92 |
|  | Base + Acid | 0.15 | 0.15 | 8.5 | 1.5 | 6 | 61.92 |
| Sample 7 | Base | 0.12 | 0.18 | 0 | 0 | 6 | 61.92 |
|  | Acid | 0.12 | 0.18 | 8.5 | 0 | 6 | 61.92 |
|  | Base + Acid | 0.12 | 0.18 | 8.5 | 1.5 | 6 | 61.92 |
| Sample 8 | Base | 0.09 | 0.21 | 0 | 0 | 6 | 61.92 |
|  | Acid | 0.09 | 0.21 | 8.5 | 0 | 6 | 61.92 |
|  | Base + Acid | 0.09 | 0.21 | 8.5 | 1.5 | 6 | 61.92 |
| Sample 9 | Base | 0.06 | 0.24 | 0 | 0 | 6 | 61.92 |
|  | Acid | 0.06 | 0.24 | 8.5 | 0 | 6 | 61.92 |
|  | Base + Acid | 0.06 | 0.24 | 8.5 | 1.5 | 6 | 61.92 |
| Sample 10 | Base | 0.03 | 0.27 | 0 | 0 | 6 | 61.92 |
|  | Acid | 0.03 | 0.27 | 8.5 | 0 | 6 | 61.92 |
|  | Base + Acid | 0.03 | 0.27 | 8.5 | 1.5 | 6 | 61.92 |
| Sample 11 | Base | 0 | 0.3 | 0 | 0 | 6 | 61.92 |
|  | Acid | 0 | 0.3 | 8.5 | 0 | 6 | 61.92 |
|  | Base + Acid | 0 | 0.3 | 8.5 | 1.5 | 6 | 61.92 |

Set 3: 0.1 wt % azo-dye

|  |  | Red 40 | Yellow 5 | Citric Acid | Potassium Citrate | Salt | Water |
|---|---|---|---|---|---|---|---|
| Sample 1 | Base | 0.1 | 0 | 0 | 0 | 6 | 61.92 |
|  | Base + Acid | 0.1 | 0 | 8.5 | 1.5 | 6 | 61.92 |
| Sample 2 | Base | 0.09 | 0.01 | 0 | 0 | 6 | 61.92 |
|  | Base + Acid | 0.09 | 0.01 | 8.5 | 1.5 | 6 | 61.92 |
| Sample 3 | Base | 0.08 | 0.02 | 0 | 0 | 6 | 61.92 |
|  | Base + Acid | 0.08 | 0.02 | 8.5 | 1.5 | 6 | 61.92 |
| Sample 4 | Base | 0.07 | 0.03 | 0 | 0 | 6 | 61.92 |
|  | Base + Acid | 0.07 | 0.03 | 8.5 | 1.5 | 6 | 61.92 |
| Sample 5 | Base | 0.06 | 0.04 | 0 | 0 | 6 | 61.92 |
|  | Base + Acid | 0.06 | 0.04 | 8.5 | 1.5 | 6 | 61.92 |
| Sample 6 | Base | 0.05 | 0.05 | 0 | 0 | 6 | 61.92 |
|  | Base + Acid | 0.05 | 0.05 | 8.5 | 1.5 | 6 | 61.92 |
| Sample 7 | Base | 0.04 | 0.06 | 0 | 0 | 6 | 61.92 |
|  | Base + Acid | 0.04 | 0.06 | 8.5 | 1.5 | 6 | 61.92 |
| Sample 8 | Base | 0.03 | 0.07 | 0 | 0 | 6 | 61.92 |
|  | Base + Acid | 0.03 | 0.07 | 8.5 | 1.5 | 6 | 61.92 |
| Sample 9 | Base | 0.02 | 0.08 | 0 | 0 | 6 | 61.92 |
|  | Base + Acid | 0.02 | 0.08 | 8.5 | 1.5 | 6 | 61.92 |
| Sample 10 | Base | 0.01 | 0.09 | 0 | 0 | 6 | 61.92 |
|  | Base + Acid | 0.01 | 0.09 | 8.5 | 1.5 | 6 | 61.92 |
| Sample 11 | Base | 0 | 0.1 | 0 | 0 | 6 | 61.92 |
|  | Base + Acid | 0 | 0.1 | 8.5 | 1.5 | 6 | 61.92 |

Set 4: 0.1 wt % azo-dye

|  |  | Red 40 | Yellow 5 | Citric Acid | Potassium Citrate | Salt | Water |
|---|---|---|---|---|---|---|---|
| Sample 1 | Base | 0.1 | 0 | 0 | 0 | 6 | 61.92 |
|  | Base + Acid | 0.1 | 0 | 8.5 | 1.5 | 6 | 61.92 |
| Sample 2 | Base | 0.099 | 0.001 | 0 | 0 | 6 | 61.92 |
|  | Base + Acid | 0.099 | 0.001 | 8.5 | 1.5 | 6 | 61.92 |
| Sample 3 | Base | 0.0975 | 0.0025 | 0 | 0 | 6 | 61.92 |
|  | Base + Acid | 0.0975 | 0.0025 | 8.5 | 1.5 | 6 | 61.92 |
| Sample 4 | Base | 0.095 | 0.005 | 0 | 0 | 6 | 61.92 |
|  | Base + Acid | 0.095 | 0.005 | 8.5 | 1.5 | 6 | 61.92 |
| Sample 5 | Base | 0.0925 | 0.0075 | 0 | 0 | 6 | 61.92 |
|  | Base + Acid | 0.0925 | 0.0075 | 8.5 | 1.5 | 6 | 61.92 |
| Sample 6 | Base | 0.09 | 0.01 | 0 | 0 | 6 | 61.92 |
|  | Base + Acid | 0.09 | 0.01 | 8.5 | 1.5 | 6 | 61.92 |
| Sample 7 | Base | 0.01 | 0.09 | 0 | 0 | 6 | 61.92 |
|  | Base + Acid | 0.01 | 0.09 | 8.5 | 1.5 | 6 | 61.92 |
| Sample 8 | Base | 0.0075 | 0.0925 | 0 | 0 | 6 | 61.92 |
|  | Base + Acid | 0.0075 | 0.0925 | 8.5 | 1.5 | 6 | 61.92 |
| Sample 9 | Base | 0.005 | 0.095 | 0 | 0 | 6 | 61.92 |
|  | Base + Acid | 0.005 | 0.095 | 8.5 | 1.5 | 6 | 61.92 |
| Sample 10 | Base | 0.0025 | 0.0975 | 0 | 0 | 6 | 61.92 |
|  | Base + Acid | 0.0025 | 0.0975 | 8.5 | 1.5 | 6 | 61.92 |
| Sample 11 | Base | 0.001 | 0.099 | 0 | 0 | 6 | 61.92 |
|  | Base + Acid | 0.001 | 0.099 | 8.5 | 1.5 | 6 | 61.92 |

-continued

Set 4: 0.1 wt % azo-dye

|  |  | Red 40 | Yellow 5 | Citric Acid | Potassium Citrate | Salt | Water |
|---|---|---|---|---|---|---|---|
| Sample 12 | Base | 0 | 0.1 | 0 | 0 | 6 | 61.92 |
|  | Base + Acid | 0 | 0.1 | 8.5 | 1.5 | 6 | 61.92 |

For each sample of each set, the ratios of Red 40:Yellow 5 were varied under the presence of a) salt; b) salt and acid [not every set]; and c) salt, acid, and base. The additional components, including flavors or other components, comprise the remaining weight percent of the formulations in the chart. The rows that are italicized and bolded indicate samples for which the beverage concentrate formulations exhibited no azo-dye precipitation at ambient or refrigerated conditions for at least one week of additional stability, when the azo-dye blend variant is compared to its un-blended, single-azo-dye control.

In Set 1, the formulations each contained a total azo-dye amount of 0.6 wt % of the beverage product. As shown by the results set forth in the Set 1 table above, the samples containing azo-dye ratios between about 75:25 and 1:19 demonstrated inhibited precipitation. Inhibited precipitation is defined as providing the solution at least one week of additional stability under refrigerated conditions, when the composition containing azo-dye blend (Variant) is compared to the composition containing un-blended, single-azo-dye (Control, represented by Sample 1). In Set 1, "Sample 1 Base" showed precipitate after about 1 month, "Sample 1 Acid" showed precipitate after about 1 month, "Sample 1 Base+Acid" showed precipitate after about 1 week, "Sample 23 Base" showed precipitate after about 1 day, "Sample 23 Acid" showed precipitate after about 3 weeks, "Sample 23 Base+Acid" showed precipitate after about 1 week.

In Set 1, for the samples labeled as "Base+Acid", an azo-dye blend ratio of 3:1 to 3:17; Red 40: Yellow 5 were successful at preventing precipitation under refrigerated conditions for over one year past the observance of precipitation of Sample 1 "Base+Acid" and Sample 23 "Base+Acid," with the study still ongoing. Sample 20 "Base+Acid" was successful in delaying the onset of precipitation for about 4 months past the observance of precipitation of Sample 1 and Sample 23 "Base+Acid."

In Set 2, the formulations each contained a total azo-dye amount of 0.3 wt % of the beverage product. As shown by the results set forth in the Set 2 table above, the samples containing azo-dye ratios between 9:1 and 1:9 demonstrated inhibited precipitation. Inhibited precipitation is defined as providing the solution at least one week of additional stability under refrigerated conditions, when the azo-dye blend Variant is compared to its un-blended, single-azo-dye Control. In Set 2, "Sample 1 Base" showed precipitate after about 3 weeks, "Sample 1 Acid" showed precipitate after about 3 weeks, "Sample 1 Base+Acid" showed precipitate after about 1 week, "Sample 11 Base" showed precipitate after about 1 day, "Sample 11 Acid" showed precipitate after about 3 weeks, "Sample 11 Base+Acid" showed precipitate after about 4 days.

In Set 2, for the samples labeled as "Base+Acid", an azo-dye blend ratio of 8:2 to 1:9; Red 40: Yellow 5 were successful at preventing precipitation under refrigerated conditions for over one year past the observance of precipitation of Sample 1 "Base+Acid" and Sample 11 "Base+Acid," with the study still ongoing. Sample 2 "Base+Acid" was successful in delaying the onset of precipitation for about 1.5 months past the observance of precipitation of Sample 1 and Sample 11 "Base+Acid."

In Set 3, the formulations each contained a total azo-dye amount of 0.1 wt % of the beverage product. As shown by the results set forth in the Set 3 table above, the samples containing azo-dye ratios of about 9:1 to 1:9 demonstrated inhibited precipitation. Inhibited precipitation is defined as providing the solution at least one week of additional stability under refrigerated conditions, when the azo-dye blend Variant is compared to its un-blended, single-azo-dye Control. In Set 3, "Sample 1 Base" showed precipitate at about 5 weeks, "Sample 1 Base+Acid" showed precipitate at about 2 and a half weeks, "Sample 11 Base" showed precipitate after about 1 day, "Sample 11 Base+Acid" showed precipitate after about 1 months.

In Set 3, for the samples labeled as "Base+Acid", an azo-dye blend ratio of 9:1 to 1:9; Red 40: Yellow 5 were successful at preventing precipitation under refrigerated conditions for over one year past the observance of precipitation of Sample 1 "Base+Acid" and Sample 11 "Base+Acid," with the study still ongoing.

In Set 4, the formulations each contained a total azo-dye amount of 0.1 wt % of the beverage product. As shown by the results set forth in the Set 3 table above, the samples containing azo-dye ratios of about 99:1 to 1:99 demonstrated inhibited precipitation. Inhibited precipitation is defined as providing the solution at least one week of additional stability under refrigerated conditions, when the azo-dye blend Variant is compared to its un-blended, single-azo-dye Control. In Set 4, "Sample 1 Base" showed precipitate at about 5 weeks, "Sample 1 Base+Acid" showed precipitate after about 2 and a half months, "Sample 12 Base" showed precipitate after about 1 day, "Sample 11 Base+Acid" showed precipitate after about 4 months.

In Set 4, for the samples labeled as "Base+Acid", an azo-dye blend ratio of 95:5 to 1:99; Red 40: Yellow 5 were successful at preventing precipitation under refrigerated conditions for over 4 months past the observance of precipitation of Sample 1 "Base+Acid" and for over 3 months past the observance of precipitation of Sample 11 "Base+Acid," with the study still ongoing. Sample 2 "Base+Acid" was successful in delaying the onset of precipitation for about 1 and a half months past the observance of precipitation of Sample 1. Sample 3 "Base+Acid" was successful in delaying the onset of precipitation for about 4 months past the observance of precipitation of Sample 1.

These results demonstrate that reducing the amount of color from 0.6 wt % to 0.3 wt % or 0.1 wt % inhibited precipitation of the azo-dyes with a less equal ratio of azo-dyes to each other.

Example 3

Beverage products were prepared according to the following gram-weight formulations:

Set 1: 0.1 wt % azo-dye

|  |  | Yellow 5 | Yellow 6 | Citric Acid | Potassium Citrate | Salt | Water |
|---|---|---|---|---|---|---|---|
| Sample 1 | Base | 0.1 | 0 | 0 | 0 | 6 | 61.92 |
|  | Base + Acid | 0.1 | 0 | 8.5 | 1.5 | 6 | 61.92 |
| Sample 2 | Base | 0.09 | 0.01 | 0 | 0 | 6 | 61.92 |
|  | Base + Acid | 0.09 | 0.01 | 8.5 | 1.5 | 6 | 61.92 |

-continued

| Set 1: 0.1 wt % azo-dye | | | | | | |
|---|---|---|---|---|---|---|
| | | Yellow 5 | Yellow 6 | Citric Acid | Potassium Citrate | Salt | Water |
| Sample 3 | Base | 0.08 | 0.02 | 0 | 0 | 6 | 61.92 |
| | Base + Acid | 0.08 | 0.02 | 8.5 | 1.5 | 6 | 61.92 |
| Sample 4 | Base | 0.07 | 0.03 | 0 | 0 | 6 | 61.92 |
| | Base + Acid | 0.07 | 0.03 | 8.5 | 1.5 | 6 | 61.92 |
| Sample 5 | Base | 0.06 | 0.04 | 0 | 0 | 6 | 61.92 |
| | Base + Acid | 0.06 | 0.04 | 8.5 | 1.5 | 6 | 61.92 |
| Sample 6 | Base | 0.05 | 0.05 | 0 | 0 | 6 | 61.92 |
| | Base + Acid | 0.05 | 0.05 | 8.5 | 1.5 | 6 | 61.92 |
| Sample 7 | Base | 0.04 | 0.06 | 0 | 0 | 6 | 61.92 |
| | Base + Acid | 0.04 | 0.06 | 8.5 | 1.5 | 6 | 61.92 |
| Sample 8 | Base | 0.03 | 0.07 | 0 | 0 | 6 | 61.92 |
| | Base + Acid | 0.03 | 0.07 | 8.5 | 1.5 | 6 | 61.92 |
| Sample 9 | Base | 0.02 | 0.08 | 0 | 0 | 6 | 61.92 |
| | Base + Acid | 0.02 | 0.08 | 8.5 | 1.5 | 6 | 61.92 |
| Sample 10 | Base | 0.01 | 0.09 | 0 | 0 | 6 | 61.92 |
| | Base + Acid | 0.01 | 0.09 | 8.5 | 1.5 | 6 | 61.92 |
| Sample 11 | Base | 0 | 0.1 | 0 | 0 | 6 | 61.92 |
| | Base + Acid | 0 | 0.1 | 8.5 | 1.5 | 6 | 61.92 |

| Set 2: 0.1 wt % azo-dye | | | | | | |
|---|---|---|---|---|---|---|
| | | Yellow 5 | Yellow 6 | Citric Acid | Potassium Citrate | Salt | Water |
| Sample 1 | Base | 0.1 | 0 | 0 | 0 | 6 | 61.92 |
| | Base + Acid | 0.1 | 0 | 8.5 | 1.5 | 6 | 61.92 |
| Sample 2 | Base | 0.099 | 0.001 | 0 | 0 | 6 | 61.92 |
| | Base + Acid | *0.099* | *0.001* | *8.5* | *1.5* | *6* | *61.92* |
| Sample 3 | Base | 0.0975 | 0.0025 | 0 | 0 | 6 | 61.92 |
| | Base + Acid | *0.0975* | *0.0025* | *8.5* | *1.5* | *6* | *61.92* |
| Sample 4 | Base | 0.095 | 0.005 | 0 | 0 | 6 | 61.92 |
| | Base + Acid | *0.095* | *0.005* | *8.5* | *1.5* | *6* | *61.92* |
| Sample 5 | Base | 0.0925 | 0.0075 | 0 | 0 | 6 | 61.92 |
| | Base + Acid | *0.0925* | *0.0075* | *8.5* | *1.5* | *6* | *61.92* |
| Sample 6 | Base | 0.09 | 0.01 | 0 | 0 | 6 | 61.92 |
| | Base + Acid | *0.09* | *0.01* | *8.5* | *1.5* | *6* | *61.92* |
| Sample 7 | Base | 0.01 | 0.09 | 0 | 0 | 6 | 61.92 |
| | Base + Acid | *0.01* | *0.09* | *8.5* | *1.5* | *6* | *61.92* |
| Sample 8 | Base | 0.0075 | 0.0925 | 0 | 0 | 6 | 61.92 |
| | Base + Acid | *0.0075* | *0.0925* | *8.5* | *1.5* | *6* | *61.92* |
| Sample 9 | Base | 0.005 | 0.095 | 0 | 0 | 6 | 61.92 |
| | Base + Acid | *0.005* | *0.095* | *8.5* | *1.5* | *6* | *61.92* |
| Sample 10 | Base | 0.0025 | 0.0975 | 0 | 0 | 6 | 61.92 |
| | Base + Acid | *0.0025* | *0.0975* | *8.5* | *1.5* | *6* | *61.92* |
| Sample 11 | Base | 0.001 | 0.099 | 0 | 0 | 6 | 61.92 |
| | Base + Acid | *0.001* | *0.099* | *8.5* | *1.5* | *6* | *61.92* |
| Sample 12 | Base | 0 | 0.1 | 0 | 0 | 6 | 61.92 |
| | Base + Acid | 0 | 0.1 | 8.5 | 1.5 | 6 | 61.92 |

For each sample of each set, the ratios of Red 40:Yellow 5 were varied under the presence of a) salt; and b) salt, acid, and base. The additional components, including flavors or other components, comprise the remaining weight percent of the formulations in the chart. The rows that are italicized and bolded indicate samples for which the beverage concentrate formulations exhibited no azo-dye precipitation at ambient or refrigerated conditions for at least one week of additional stability, when the azo-dye blend Variant is compared to its un-blended, single-azo-dye Control.

In Set 1, the formulations each contained a total azo-dye amount of 0.1 wt % of the beverage product. As shown by the results set forth in the Set 1 table above, the samples containing azo-dye ratios between 9:1 and 1:9 demonstrated inhibited precipitation. Inhibited precipitation is defined as providing the solution at least one week of additional stability under refrigerated conditions, when the azo-dye blend Variant is compared to its un-blended, single-azo-dye Control. In Set 1, "Sample 1 Base" showed precipitate after 1 day, "Sample 1 Base+Acid" showed precipitate after about 1 month, "Sample 11 Base" showed precipitate after about six days, "Sample 11 Base+Acid" showed precipitate after about 6 days.

In Set 1, for the samples labeled as "Base+Acid", an azo-dye blend ratio of 8:2 to 1:9; Yellow 5: Yellow 6 were successful at preventing precipitation under refrigerated conditions for over 11 months past the observance of precipitation of Sample 1 "Base+Acid" and for over 1 year past Sample 11 "Base+Acid," with the study still ongoing. Sample 2 "Base+Acid" was successful in delaying the onset of precipitation for about 11 months past the observance of precipitation of Sample 1 "Base+Acid."

In Set 2, the formulations each contained a total azo-dye amount of 0.1 wt % of the beverage product. As shown by the results set forth in the Set 2 table above, the "Acid and Base" samples containing azo-dye ratios between 99:1 and 1:99 demonstrated inhibited precipitation. Inhibited precipitation is defined as providing the solution at least one week of additional stability under refrigerated conditions, when the azo-dye blend Variant is compared to its un-blended, single-azo-dye Control. In Set 2, "Sample 1 Base" showed precipitate after 1 day, "Sample 1 Base+Acid" showed precipitate after about 1 month, "Sample 12 Base" showed precipitate after about 1 day, "Sample 12 Base+Acid" showed precipitate after about 1 week.

In Set 2, for the samples labeled as "Base+Acid", an azo-dye blend ratio of 99:1 to 1:9; Yellow 5: Yellow 6 were successful at preventing precipitation under refrigerated conditions for over 6 months past the observance of precipitation of Sample 1 "Base+Acid" and Sample 11 "Base+Acid," with the study still ongoing. Sample 8 "Base+Acid" was successful in delaying the onset of precipitation for about 6 months past the observance of precipitation of Sample 12. Sample 9 "Base+Acid" was successful in delaying the onset of precipitation for about 3 weeks past the observance of precipitation of Sample 12. Samples 10 and 11 "Base+Acid" were successful in delaying the onset of precipitation for about 1 week past the observance of precipitation of Sample 12.

These results further demonstrate that reducing the amount of color from 0.6 wt % to 0.3 wt % or 0.1 wt % inhibited precipitation of the azo-dyes with a less equal ratio of azo-dyes to each other.

Example 4

Beverage product was prepared according to the following formulation:

| FORMULATION | Sample 1 wt % | Sample 2 wt % |
|---|---|---|
| Water | 53.8726 | 53.8726 |
| Potassium Sorbate | 0.0500 | 0.0500 |
| K-Citrate | 1.0890 | 1.0890 |
| Fruit punch flavor | 7.9929 | 7.9929 |
| Sucralose Liquid | 3.7790 | 3.7790 |
| Ace K | 0.4657 | 0.4657 |
| Red 40 ground (azo-dye) | 0.1240 | 0.1240 |
| Citric Acid | 18.1884 | 18.1884 |
| Mono K-Phosphate | 2.1044 | 2.1044 |
| Malic Acid | 2.2728 | 2.2728 |
| Salt (NaCl) | 6.0613 | 6.0613 |
| Natural Red Cherry Red Color | 4.0000 | x |
| Water | x | 4.000 |
| Sum w/o Water: | 46.1274 | 46.1274 |
| Total Sum: | 100.0000 | 100.0000 |
| Water | 53.8726 | 53.8726 |

Figure 2:
FIG. 2 shows a beverage product containing an azo-dye and a natural colorant after one year of refrigeration.

Samples 1 and 2 were stored at 40° F. for one year. Sample 2, which contains azo-dye but does not contain the natural red colorant showed precipitation of the azo-dye, as seen in FIG. 1. Sample 1, which contains the natural red colorant in addition to the azo-dye, showed no precipitation of the azo-dye, as seen in FIG. 2. Such results demonstrate the ability of the natural dye to inhibit the precipitation of the azo-dye from solution.

Example 5

A 90× electrolyte beverage product was made without flavor containing 0.45 wt % Red 40, and a 3.0% benzaldehyde solution was made with propylene glycol. The benzaldehyde solution was then added back to the flavorless base at various levels up to 10%. As a control, the same variants were made without benzaldehyde solution, but with 100% propylene glycol, to confirm that any precipitation was directly due to the benzaldehyde and not propylene glycol. The formulations are as follows:

Base formulation:

| Red 40 model System | |
|---|---|
| | Wt % |
| Water | 73.9451 |
| Potassium Sorbate | 0.0500 |
| K-Citrate | 1.0219 |
| Benzaldehyde/PG | 10.0000* |
| Red 40 ground (azo-dye) | 0.4500 |
| Citric Acid | 8.5330 |
| Salt (NaCl) | 6.0000 |
| Sum w/o Water: | 26.0549 |
| Total Sum: | 100.0000 |
| Sum without Flavor | 90.0000 |

*left out of base

3% propylene glycol solution:

| | 3% Benzaldehyde Solution (% by weight) |
|---|---|
| Benzaldehyde | 3 |
| Propylene Glycol | 97 |

Variants:

| 3% Benzaldehyde Solution | % PG (Controls) | Electrolyte Base (%) | Water (%) | Total |
|---|---|---|---|---|
| 0.1 | x | 90 | 9.9 | 100 |
| 0.25 | x | 90 | 9.75 | 100 |
| 0.5 | x | 90 | 9.5 | 100 |
| 1 | x | 90 | 9 | 100 |
| 2 | x | 90 | 8 | 100 |
| 4 | x | 90 | 6 | 100 |
| 6 | x | 90 | 4 | 100 |
| 8 | x | 90 | 2 | 100 |
| 10 | x | 90 | 0 | 100 |
| x | 0.1 | 90 | 9.9 | 100 |
| x | 0.25 | 90 | 9.75 | 100 |
| x | 0.5 | 90 | 9.5 | 100 |
| x | 1 | 90 | 9 | 100 |
| x | 2 | 90 | 8 | 100 |
| x | 4 | 90 | 6 | 100 |
| x | 6 | 90 | 4 | 100 |
| x | 8 | 90 | 2 | 100 |
| x | 10 | 90 | 0 | 100 |

Results:

| 3% Benzaldehyde Solution | PG 100% | Observations after 2 months at 70 F. (room temp) |
|---|---|---|
| 0.1 | x | No precipitation |
| 0.25 | x | No precipitation |
| 0.5 | x | No precipitation |
| 1 | x | No precipitation |
| 2 | x | No precipitation |
| 4 | x | Precipitation within 1-2 weeks |
| 6 | x | Precipitation within days |
| 8 | x | Precipitation within hours |
| 10 | x | Precipitation within hours |
| x | 0.1 | No precipitation |
| x | 0.25 | No precipitation |
| x | 0.5 | No precipitation |
| x | 1 | No precipitation |
| x | 2 | No precipitation |
| x | 4 | No precipitation |
| x | 6 | No precipitation |
| x | 8 | No precipitation |
| x | 10 | No precipitation |

After letting the variants sit for two months at room temperature, the solutions containing 0.12%, 0.18%, 0.24%, and 0.3% benzaldehyde formed precipitation. The solutions containing 0.24% and 0.3% benzaldehyde formed precipitation within hours when produced and stored at room temperature (70° F.). None of the propylene glycol controls formed precipitation, proving that benzaldehyde was the cause of the system's instability. Based on these results, it is demonstrated that a 90× electrolyte concentrate with 0.45 wt % Red 40 can contain up to 0.11% benzaldehyde to have a system free of precipitation when stored for up to 2 months.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

The claims directed to the method of the present invention should not be limited to the performance of their steps in the order written except where expressly stated, and one skilled in the art can readily appreciate that the steps may be varied and still remain within the spirit and scope of the present invention.

We claim:

1. A beverage concentrate solution comprising:
   (a) a first azo-component and a second azo-component, wherein the first azo-component and the second azo-component are present in a combined amount of about 0.1 wt. % to about 6 wt. % of the beverage concentrate;
   (b) an electrolyte comprising sodium chloride and/or potassium salt in an amount of about 2 wt. % to about 9 wt. % of the beverage concentrate; and
   (c) a solvent,
   wherein the weight ratio of the first azo-component to the second azo-component is about 1:3 to about 3:1,
   wherein the second azo-component is different from the first azo-component,
   wherein the first azo-component and the second azo-component is selected from the group consisting of Red 40, Yellow 5, and Yellow 6, and
   wherein the first azo-component and the second azo-component remain in solution for at least seven days under refrigerated or ambient conditions.

2. The beverage concentrate solution of claim 1, wherein the first azo-component and the second-azo component remain in solution for at least thirty days under refrigerated or ambient conditions.

3. The beverage concentrate solution of claim 1, wherein the first azo-component and the second-azo component remain in solution for at least one year under refrigerated or ambient conditions.

4. The beverage concentrate solution of claim 1, wherein the first azo-component and the second azo-component remain in solution for at least seven days under refrigeration.

5. The beverage concentrate solution of claim 1, wherein the first azo-component and the second azo-component remain in solution for at least 1 month under refrigeration.

6. The beverage concentrate solution of claim 1, wherein the first azo-component and the second azo-component remain in solution for at least 3 months under refrigeration.

7. The beverage concentrate solution of claim 1, wherein the first azo-component and the second azo-component remain in solution for at least 6 months under refrigeration.

8. The beverage concentrate solution of claim 1, wherein the first azo-component and the second azo-component remain in solution for at least 1 year under refrigeration.

9. The beverage concentrate solution of claim 1, further comprising a non azo-dye colorant.

10. The beverage concentrate solution of claim 1, wherein the beverage concentrate contains no more than 0.12 wt % benzaldehyde.

11. A beverage concentrate solution comprising a solution of:
    (a) a first azo-component and a second azo-component, wherein the first azo-component and the second azo-component are present in a combined amount of about 0.1 wt. % to about 6 wt. % of the beverage concentrate;
    (b) an electrolyte comprising sodium chloride and/or potassium salt in an amount of about 2 wt. % to about 9 wt. % of the beverage concentrate; and
    (c) a solvent,
    wherein the weight ratio of the first azo-component to the second azo-component is about 1:3 to about 3:1,
    wherein the second azo-component is different from the first azo-component,
    wherein the first azo-component and the second azo-component is selected from the group consisting of Red 40, Yellow 5, and Yellow 6, and
    wherein the first azo-component and the second-component remain in solution for a period of time longer than a period of time than the first azo-component would remain in the solution without the second azo-component, under refrigerated or ambient conditions.

12. The beverage concentrate solution of claim 11, further comprising a non azo-dye colorant.

13. The beverage concentrate solution of claim 11, wherein the beverage concentrate contains no more than 0.12 wt % benzaldehyde.

14. The beverage concentrate solution according to claim 1, further comprising an oil.

15. The beverage concentrate solution of claim 14, wherein the oil is incorporated into the beverage product as a micro emulsion.

16. The beverage concentrate solution of claim 14, wherein the oil is incorporated into the beverage product as a nano emulsion.

17. The beverage concentrate solution of claim 14, wherein the oil is incorporated into the beverage product as a conventional emulsion.

18. The beverage concentrate solution of claim 17, comprising an emulsifier including modified-food starch, gum acacia, or combinations thereof.

19. The beverage concentrate solution of claim 14, wherein the oil is a clouding or flavor oil.

20. The beverage concentrate solution of claim 14, wherein the first azo-component remains in solution for at least thirty days under refrigerated or ambient conditions.

21. The beverage concentrate solution of claim 14, wherein the first azo-component remains in solution for at least one year under refrigerated and/or ambient conditions.

22. The beverage concentrate solution of claim 14, wherein the first azo-component remains in solution for at least seven days under refrigeration.

23. The beverage concentrate solution of claim 14, wherein the first azo-component remains in solution for at least 1 month under refrigeration.

24. The beverage concentrate solution of claim 14, wherein the first azo-component remains in solution for at least 3 months under refrigeration.

25. The beverage concentrate solution of claim 14, wherein the first azo-component remains in solution for at least 6 months under refrigeration.

26. The beverage concentrate solution of claim 14, wherein the first azo-component remains in solution for at least 1 year under refrigeration.

27. The beverage concentrate solution according to claim 11, further comprising an oil.

28. The beverage concentrate solution of claim 27, wherein the oil is incorporated into the beverage product as a micro emulsion.

29. The beverage concentrate solution of claim 27, wherein the oil is incorporated into the beverage product as a nano emulsion.

30. The beverage concentrate solution of claim 27, wherein the oil is incorporated into the beverage product as a conventional emulsion.

31. The beverage concentrate solution of claim 30, comprising an emulsifier including modified-food starch, gum acacia, or combinations thereof.

32. The beverage concentrate solution of claim 27, wherein the oil comprises a clouding and/or flavor oil.

33. The beverage concentrate solution of claim 27, wherein the first azo-component and the second-azo component remain in solution for at least thirty days under refrigerated or ambient conditions.

34. The beverage concentrate solution of claim 27, wherein the first azo-component and the second-azo component remain in solution for at least one year under refrigerated or ambient conditions.

35. The beverage concentrate solution of claim 27, wherein the first azo-component and the second azo-component remain in solution for at least seven days under refrigeration.

36. The beverage concentrate solution of claim 27, wherein the first azo-component and the second azo-component remain in solution for at least 1 month under refrigeration.

37. The beverage concentrate solution of claim 27, wherein the first azo-component and the second azo-component remain in solution for at least 3 months under refrigeration.

38. The beverage concentrate solution of claim 27, wherein the first azo-component and the second azo-component remain in solution for at least 6 months under refrigeration.

39. The beverage concentrate solution of claim 27, wherein the first azo-component and the second azo-component remain in solution for at least 1 year under refrigeration.

40. The beverage concentrate solution according to claim 1, further comprising a non azo-component colorant and an oil.

41. The beverage concentrate solution of claim 40, wherein the oil is incorporated into the beverage product as a micro emulsion.

42. The beverage concentrate solution of claim 40, wherein the oil is incorporated into the beverage product as a nano emulsion.

43. The beverage concentrate solution of claim 40, wherein the oil is incorporated into the beverage product as a conventional emulsion.

44. The beverage concentrate solution of claim 43, further comprising an emulsifier, wherein the emulsifier comprises modified-food starch, gum acacia, or combinations thereof.

45. The beverage concentrate solution of claim 40, wherein the oil is a clouding and/or flavor oil.

46. The beverage concentrate solution of claim 40, wherein the first azo-component remains in solution for at least thirty days under refrigerated and/or ambient conditions.

47. The beverage concentrate solution of claim 40, wherein the first azo-component remains in solution for at least one year under refrigerated and/or ambient conditions.

48. The beverage concentrate solution of claim 40, wherein the first azo-component remains in solution for at least seven days under refrigeration.

49. The beverage concentrate solution of claim 40, wherein the first azo-component remains in solution for at least 1 month under refrigeration.

50. The beverage concentrate solution of claim 40, wherein the first azo-component remains in solution for at least 3 months under refrigeration.

51. The beverage concentrate solution of claim 40, wherein the first azo-component remains in solution for at least 6 months under refrigeration.

52. The beverage concentrate solution of claim 40, wherein the first azo-component remains in solution for at least 1 year under refrigeration.

* * * * *